US012712345B2

(12) United States Patent
Hinley

(10) Patent No.: US 12,712,345 B2
(45) Date of Patent: Aug. 18, 2026

(54) ELECTRICAL CONDUIT JUNCTION BOXES

(71) Applicant: NIGLON LIMITED, Solihull (GB)

(72) Inventor: Simon Hinley, Solihull (GB)

(73) Assignee: Niglon Limited, Solihull (GB)

( * ) Notice: Subject to any disclaimer, the term of this patent is extended or adjusted under 35 U.S.C. 154(b) by 647 days.

(21) Appl. No.: 18/005,466

(22) PCT Filed: Jul. 13, 2021

(86) PCT No.: PCT/EP2021/069540
§ 371 (c)(1),
(2) Date: Jan. 13, 2023

(87) PCT Pub. No.: WO2022/013262
PCT Pub. Date: Jan. 20, 2022

(65) Prior Publication Data
US 2023/0268724 A1 Aug. 24, 2023

(30) Foreign Application Priority Data
Jul. 13, 2020 (GB) ...................................... 2010771

(51) Int. Cl.
*H02G 3/06* (2006.01)
*F16L 5/02* (2006.01)
*H02G 3/08* (2006.01)

(52) U.S. Cl.
CPC .............. *H02G 3/0616* (2013.01); *F16L 5/02* (2013.01); *H02G 3/06* (2013.01); *H02G 3/08* (2013.01); *H02G 3/086* (2013.01)

(58) Field of Classification Search
CPC ........ H02G 3/0616; H02G 3/086; H02G 3/06; H02G 3/08; H02G 3/0691; F16L 5/02
See application file for complete search history.

(56) References Cited

U.S. PATENT DOCUMENTS 6,143,983 A 11/2000 Burton et al.
7,126,064 B1 10/2006 Shemtov
(Continued)

FOREIGN PATENT DOCUMENTS

WO 2006109023 A2 10/2006

OTHER PUBLICATIONS

International Search Report and Written Opinion for International Application No. PCT/EP2021/069540 from the European Patent Office mailed Oct. 22, 2021.
(Continued)

*Primary Examiner* — Steven T Sawyer
(74) *Attorney, Agent, or Firm* — Keusey & Associates, P.C.

(57) ABSTRACT

An electrical conduit junction box (10) includes a body (12). The body (12) defines an interior (18). The body (12) includes an edge attachment formation (24) which defines a socket receiving aperture (22). The box (10) further includes a socket (26). The socket (26) includes a socket attachment formation (28). The box (10) is movable from a disassembled condition in which the socket (26) is separate to the body (12) and an assembled condition in which the socket (26) is located in the socket receiving aperture (22) and the socket attachment formation (28) engages the edge attachment formation (24) to secure the socket (26) to the body (12).

17 Claims, 4 Drawing Sheets

(56) References Cited

U.S. PATENT DOCUMENTS

| | | | | |
|---|---|---|---|---|
| 10,958,051 | B1 * | 3/2021 | Howard | H02G 3/0683 |
| 2009/0218131 | A1 * | 9/2009 | Sheehan | H02G 3/0625 174/665 |
| 2019/0356088 | A1 | 11/2019 | Stellmacher et al. | |

OTHER PUBLICATIONS

Search Strategy for International Application No. PCT/EP2021/069540 from the European Patent Office form P04A42.

* cited by examiner 10
76,78
12
16
14
VIII
28
VII
100
68
20
18
24
26
74,88
74,86
30
84
82
70

10
134
128
18
136
76,78
16
12
14
76
78
28
22
16
26
70
30
56
A
20
24
90
92

ELECTRICAL CONDUIT JUNCTION BOXES

BACKGROUND OF THE INVENTION

1. Field of the Invention

The present invention relates to electrical conduit junction boxes.

2. The Prior Art

In electrical installations, a conduit system comprises conduit tubing, usually formed of steel, through which electrical cables are located. The conduit system provides support and protection for the cable. Importantly, in the event of a fire, the conduit system mechanically supports the cable and prevents the cable becoming detached from ceilings or walls. Conduit systems comprise conduit junction boxes, which are used to connect lengths of conduit tubing at a junction. The boxes have lids which are removable to permit access therein.

Traditionally, the junction boxes are formed in one piece, of malleable iron, by casting and galvanising, and usually comprise one, two, three or four integrally cast outwardly extending connector sockets. After casting, the sockets must be threaded, to receive a threaded end of conduit tubing. The conduit tubing is usually cut to size and threaded on site. The on-site threading operation is time consuming and requires specialised equipment, skill, training and experience.

In this specification, the term "conduit" is taken to mean tubing formed usually of metal for carrying and protecting electrical cable.

In this specification, the term "electrical conduit junction box" could include switch, junction, connector, terminal, electrical and control boxes, cabinets, enclosures and housings to which a conduit is to be mechanically connected to the box to support and protect a cable located therein.

In this specification, the term "profile shape" means an outline of a cross sectional shape of an object in a plane normal to the longitudinal axis of the object.

"Diametrical width" is the width taken through the centre of rotation ie in the case of the socket referred to below, the longitudinal axis.

SUMMARY OF THE INVENTION

According to a first aspect of the present invention, there is provided an electrical conduit junction box, the box including a body defining an interior, the body including an edge attachment formation which defines a socket receiving aperture, the box including a socket, the socket including a socket attachment formation, the box being movable from a disassembled condition in which the socket is separate to the body and an assembled condition in which the socket is located in the socket receiving aperture and the socket attachment formation engages the edge attachment formation to secure the socket to the body.

Possibly, the box includes a base wall and side walls extending from the base wall. Possibly, the aperture is defined in one of the walls. Possibly, the walls are flat, possibly with no outwardly extending protrusions.

Possibly, in moving to or at the assembled condition, the socket attachment formation exerts a locking force upon the edge attachment formation, which may comprise a compressive force, and may comprise a gripping force.

Possibly, the locking force comprises a frictional force, which may resist movement of the socket to or at the assembled condition.

Possibly, the socket has a longitudinal axis.

Possibly, the compressive force comprises a radial force, which may be exerted substantially radially to the longitudinal axis.

Possibly, the compressive force comprises an axial force, which may be exerted substantially along or parallel to the longitudinal axis.

Possibly, in moving to the assembled condition, the socket is rotated about the longitudinal axis, to cause the socket attachment formation to engage the edge attachment formation.

Possibly, the socket is movable from a disassembled condition to the assembled condition. Possibly, the socket is removably mountable to the box and may be movable between the assembled condition and the disassembled condition.

Possibly, in moving from the disassembled condition to the assembled condition, the socket rotates through a rotation angle. Possibly, the rotation angle is no more than 120° and may be substantially 90°.

Possibly, the edge attachment formation includes edges, which may define the socket receiving aperture. Possibly, in the assembled condition, the edges are plain edges and, possibly, in the disassembled and assembled conditions are not threaded.

Possibly, the socket attachment formation defines a groove, which in the assembled condition receives the edge attachment formation. Possibly, the groove has a cross-sectional area and a length. Possibly, the cross-sectional area is reduced in at least one location along the length. Possibly, at the reduced cross-sectional area location, the socket attachment formation exerts the locking force upon the edge attachment formation.

Possibly, the socket attachment formation includes groove side walls which define the groove. Possibly, the groove has a width between the side walls, which may reduce along the groove length, so that the side walls exert the locking force upon the edge attachment formation.

Possibly, the groove extends only partway around a circumference or periphery of the socket.

Possibly, the edge attachment formation has a width. Possibly, the grove width reduces to a minimum, which may be less than the width of the edge attachment formation.

Possibly, the groove is defined by side walls spaced apart by a width, and the width reduces to comprise the reduced cross-sectional area location.

Possibly, one of the groove side walls extends normally (perpendicularly) to the longitudinal axis. Possibly, the other of the groove side walls extends at an oblique angle to the longitudinal axis. Possibly, the other of the side walls is curved and may be convex relative to the groove.

Possibly, the socket attachment formation includes a groove base wall which defines the groove. Possibly, the groove has a depth, which may reduce along its length, so that the base wall exerts the locking force upon the edge attachment formation.

Possibly, the groove has a depth defined by a base wall. Possibly, the depth reduces to comprise the reduced cross-sectional area location.

Possibly, the groove depth and the groove width both reduce along the length.

Possibly, the socket attachment formation defines a plurality of the grooves, which may be substantially identical in shape and size and may be equi-spaced around the longitudinal axis and may be rotationally symmetrical.

Possibly, the socket attachment formation defines a pair of the grooves, which may be oppositely located around the longitudinal axis.

Possibly, in the assembled condition, the socket is in a locked orientation.

Possibly, the socket is movable between an insertion orientation and the locked orientation.

Possibly, the box is arranged so that, to move to the assembled condition from the disassembled condition, the socket must be inserted into the socket receiving aperture in the insertion orientation and then rotated to the locked orientation.

Possibly, the socket receiving aperture has a shape. Possibly, the socket attachment formation has a shape which corresponds with the shape of the socket receiving aperture, and may substantially only pass through the socket receiving aperture in the insertion orientation.

Possibly, the socket receiving aperture shape is non-circular and may be elongate, possibly along an aperture longitudinal axis. Possibly, the aperture has a length along the aperture longitudinal axis and a width transverse to the aperture longitudinal axis. Possibly, the aperture length is greater than the aperture width.

Possibly, the socket receiving aperture shape is defined by the aperture edges and may comprise, in part, a straight edge, and may comprise, in part, an arced edge.

Possibly, the socket receiving aperture shape includes a plurality of the straight edges, and may comprise a corresponding plurality of the arced edges.

Possibly, the socket receiving aperture shape includes a pair of the straight edges, which may be arranged in parallel, possibly at opposite sides of the socket receiving aperture shape. Possibly, the socket receiving aperture shape includes a pair of the arced edges, one arced edge being located between two of the straight edges.

Possibly, the socket attachment formation includes an end flange, which may have a shape, which may be a profile shape, and which may correspond to the shape of the socket receiving aperture. Possibly, the end flange is arranged to pass through the socket receiving aperture substantially only in the insertion orientation.

Possibly, the end flange shape is elongate, possibly along an end flange shape longitudinal axis. Possibly, the end flange shape has a length along the end flange shape longitudinal axis and a width transverse to the end flange shape longitudinal axis. Possibly, the end flange shape length is greater than the end flange shape width.

Possibly, after the end flange has passed through the aperture in the insertion orientation, the socket is rotated towards the locked orientation which may cause the edge attachment formation to locate in the groove(s).

Possibly, the end flange comprises a plurality of peripheral side surfaces, which may comprise the socket attachment formation shape. Possibly, the peripheral side surfaces include one or more straight side surfaces and may comprise one or more arced side surfaces. Possibly, in the insertion orientation, the end flange straight side surface(s) and the end flange arced side surface(s) correspond with the straight edge(s) and arced edge(s) of the socket receiving aperture shape.

Possibly, in the insertion orientation, the straight edge of the socket receiving aperture shape and the straight side of the socket attachment formation shape are arranged substantially in parallel.

Possibly, the end flange comprises one of the groove side walls. Possibly, the oblique angled groove side wall comprises the end flange.

Possibly, in the assembled condition, the end flange side wall locates against an internal face of the edge attachment formation, thereby preventing axial withdrawal of the socket from the assembled condition.

Possibly, the socket attachment formation includes a stop formation which limits insertion of the socket into the aperture and may comprise a stop flange, which may comprise one of the groove side walls. Possibly, the normal groove side wall comprises the stop flange.

Possibly, the stop flange comprises a shape which does not correspond with, and may be larger than, the shape of the socket receiving aperture, so that the stop flange cannot pass therethrough in any orientation.

Possibly, in the assembled condition, the stop flange side wall locates against an external face of the edge attachment formation, thereby preventing further axial insertion of the socket from the assembled condition.

Possibly, the socket attachment formation includes a limit formation, which limits rotation of the socket about the longitudinal axis. Possibly, the limit formation comprises an end wall of the groove(s).

Possibly, the socket attachment formation includes an interference formation, and may include a pair of interference formations, which may extend diametrically oppositely away from each other. Possibly, the interference formations have a diametrical width. Possibly, the aperture straight edges are spaced apart by an aperture width. Possibly, the diametrical width of the interference formations is greater than the aperture width.

Possibly, in moving from the disassembled condition to the assembled condition, the socket moves from the insertion orientation, to a maximum friction orientation and then to the locked orientation.

Possibly, the interference formation defines the or one of the reduced cross-sectional area locations. Possibly, the interference formation contacts the edge attachment formation at the maximum friction orientation.

Possibly, the socket attachment formation includes a pair of the interference formations, each of which defines one of the reduced cross-sectional area locations and which both together contact the edge attachment formation at the maximum friction orientation.

Possibly, in moving between the disassembled condition and the assembled condition, the socket must pass through a maximum friction condition, in which the socket may be in the maximum friction orientation. Possibly, in the maximum friction orientation, the interference formations contact the edge attachment formation to exert the locking force, and may contact some of the edges, possibly the straight edges, of the edge attachment formation. The locking force may comprise a friction force, and may require the user to exert more force to rotate the socket.

Possibly, the socket includes a tool engaging part, which may be located adjacent the socket attachment formation, and may comprise a plurality of regularly spaced flat surfaces, which may be located around the circumference of the socket.

Possibly, the socket includes a gripping part, which may be located adjacent the tool engaging part and may comprise a plurality of gripping formations, each of which may comprise a longitudinally extending projecting ridge.

Possibly, the socket defines a through passage, which may extend along the longitudinal axis of the socket.

Possibly, the socket includes a conduit receiving formation for receiving a conduit in an inserted condition. Possibly, the conduit receiving formation defines a conduit receiving passage part, which may comprise part of the passage.

Possibly, the socket includes a relatively enlarged end.

Possibly, the conduit receiving formation includes a guide formation. Possibly, the guide formation comprises the relatively enlarged end. Possibly, the guide formation defines a guide passage part.

Possibly, the box includes a securing arrangement for securing the conduit to the socket in the inserted condition.

Possibly, the body defines a plurality of the socket receiving apertures and may include a plurality of the sockets.

Possibly, the body comprises one or a plurality of socket receiving aperture locations, each of which may comprise a line or area of relatively thinner wall material which may be removable to form an additional socket receiving aperture.

Possibly, the conduit is plain-ended.

According to a second aspect of the present invention, there is provided a body of an electrical conduit junction box for cooperation with a socket, the body defining an interior, the body including an edge attachment formation which defines a socket receiving aperture, the socket including a socket attachment formation, wherein, in an assembled condition, the socket locates in the socket receiving aperture and the socket attachment formation engages the edge attachment formation to secure the socket to the body.

According to a third aspect of the present invention, there is provided a socket for cooperation with a body of an electrical conduit junction box, the body defining an interior, the body including an edge attachment formation which defines a socket receiving aperture, the socket including a socket attachment formation, wherein, in an assembled condition, the socket locates in the socket receiving aperture and the socket attachment formation engages the edge attachment formation to secure the socket to the body.

According to a fourth aspect of the present invention, there is provided a method of connecting electrical conduit, the method including providing an electrical conduit junction box, the box including a body, the body defining an interior, the body including an edge attachment formation which defines a socket receiving aperture, the socket including a socket attachment formation, wherein, in an assembled condition, the socket locates in the socket receiving aperture and the socket attachment formation engages the edge attachment formation to secure the socket to the body.

Possibly, the box, the body and/or the socket include any of the features described in any of the preceding statements or following description. Possibly, the method includes any of the steps described in any of the preceding statements or following description.

BRIEF DESCRIPTION OF THE DRAWINGS

An embodiment of the present invention will now be described, by way of example only, and with reference to the accompanying drawings, in which.

Figure 2:
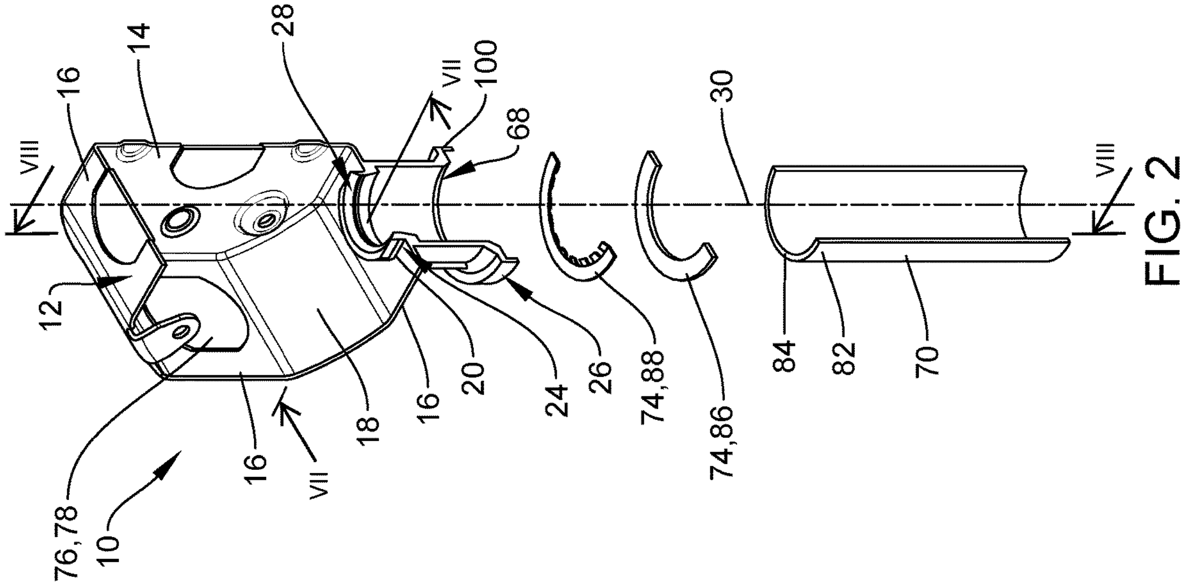
FIG. 2 is a side cross sectional perspective view of the electrical conduit junction box of FIG. 1, shown partially exploded, without lid and fasteners.

In the drawings, where multiple instances of the same or similar features exist, only a representative one or some of the instances of the features have been provided with numeric references for clarity.

DETAILED DESCRIPTION OF THE PREFERRED EMBODIMENTS

Figure 1:
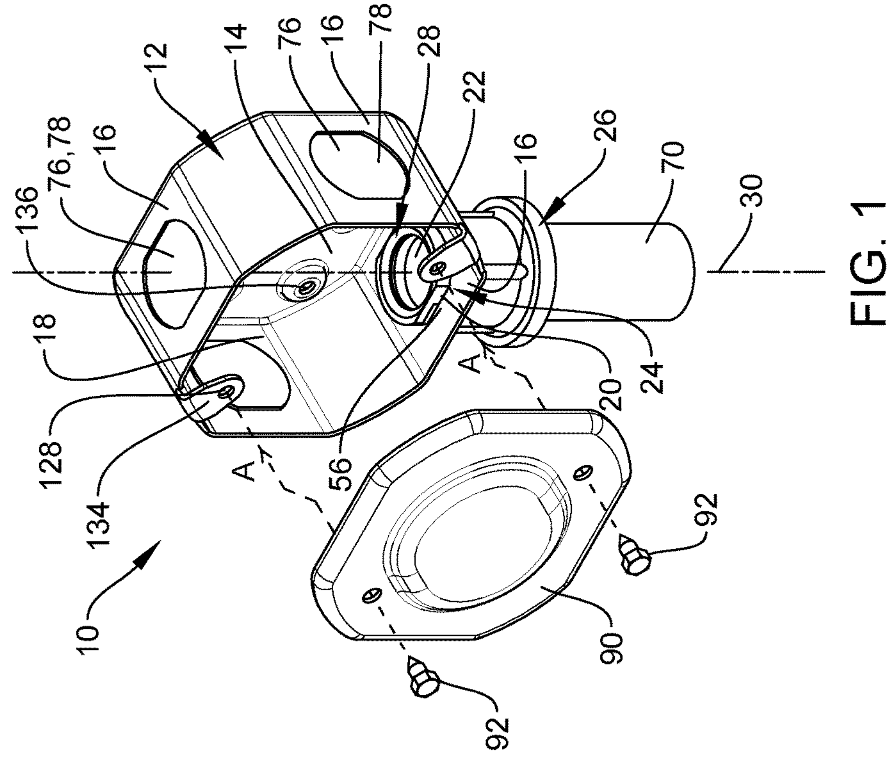
FIG. 1 is a perspective view of an electrical conduit junction box, shown partially exploded, with a socket in an insertion orientation and a conduit located in the socket.
Figure 3:
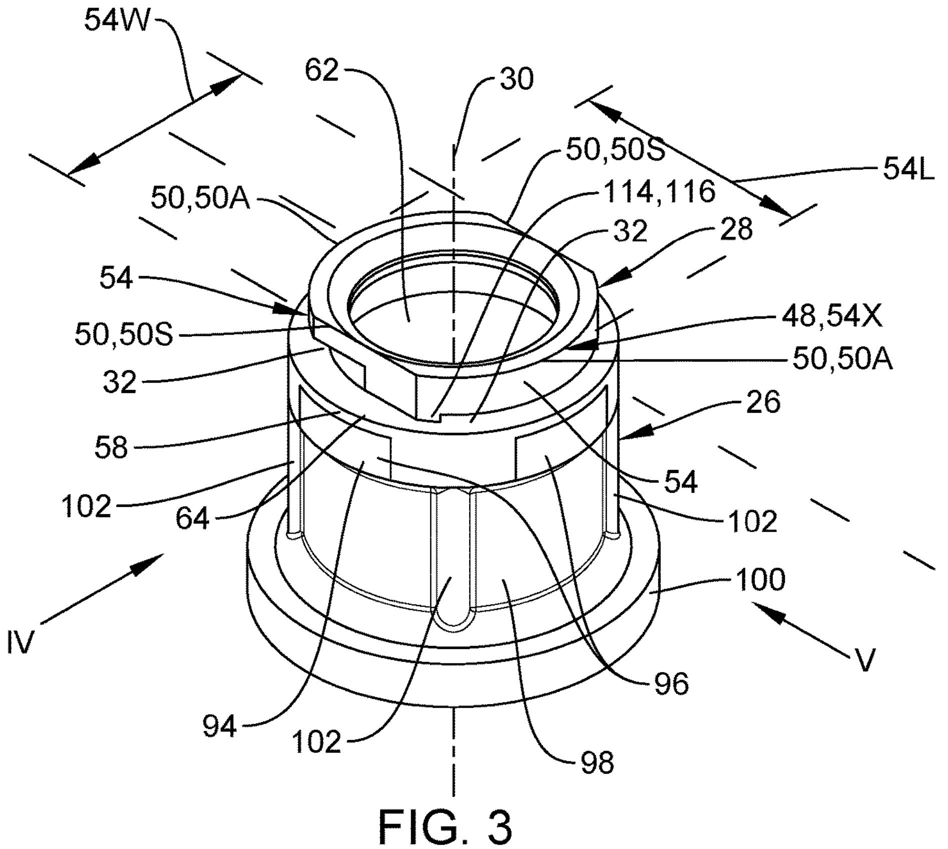
FIG. 3 is a perspective view of the socket.

FIG. 1 shows an electrical conduit junction box 10. The box 10 includes a body 12. The body 12 defines an interior 18. The body 12 includes an edge attachment formation 24 which defines a socket receiving aperture 22.

The box 10 includes a socket 26. The socket 26 includes a socket attachment formation 28. In an assembled condition, the socket 26 locates in the socket receiving aperture 22 and the socket attachment formation 28 engages the edge attachment formation 24 to secure the socket 26 to the body 12.

The box 10 includes a base wall 14 and side walls 16 extending from the base wall 14. The aperture 22 is defined in one of the side walls 16. The side walls 16 have a wall thickness 52.

The socket 26 has a longitudinal axis 30.

The socket 26 is movable from a disassembled condition to the assembled condition. In one example, the socket 26 could be removably mountable to the box 10, and could be movable from the assembled condition to the disassembled condition.

In moving from the disassembled condition to the assembled condition, the socket 26 rotates through a rotation angle 66. In the example shown, the rotation angle 66 could be no more than 120° and could be substantially 90°.

The edge attachment formation 24 includes edges 20, which define the socket receiving aperture 22.

The socket attachment formation 28 defines a pair of grooves 32, which are substantially identical in shape and size and which are equi-spaced around the longitudinal axis 30 and are rotationally symmetrical, and which, in the assembled condition, receive the edge attachment formation 24.

Each groove 32 has a radial cross-sectional area 34 and a length 36. The radial cross-sectional area 34 reduces in at least one location 34R along the length along the length 36.

The socket attachment formation 28 includes groove side walls 42 which define the grooves 32. Each groove 32 has a width 38 between the groove side walls 42, which reduces along its length 36, from a maximum width 38X to a minimum width 38N.

The edge attachment formation 24 has a thickness which, in this example, is the thickness 52 of the box side walls 16.

The groove maximum width 38X is greater than the box side wall thickness 52. The groove minimum width 38N is less than the box side wall thickness 52. Thus in this example, the groove width 38 between the side walls 42 reduces to comprise the reduced cross sectional area location 34R when the groove width 38 is less than the box side wall thickness 16.

The socket attachment formation 28 includes groove base walls 44 which define the grooves 32. Each groove 32 has a depth 40. In the example shown, the grove depth 40 remains substantially the same along the length 36.

The socket attachment formation 28 includes a limit formation 114, which limits rotation of the socket 26 about the longitudinal axis 30. The limit formation 114 comprises an end wall 116 of each groove 32.

Figure 6A:
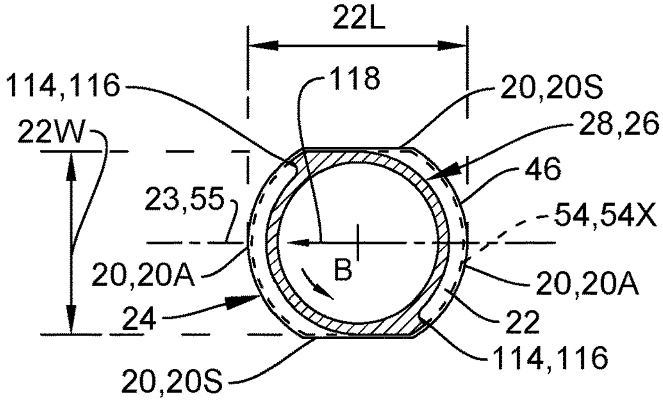
FIGS. 6A and 6B are plan schematic views of a cross-section of the socket at the level indicated by arrows VI in FIG. 4, with the socket located in a socket receiving aperture, with the socket in the insertion orientation and a maximum locked orientation respectively.
Figure 6B:
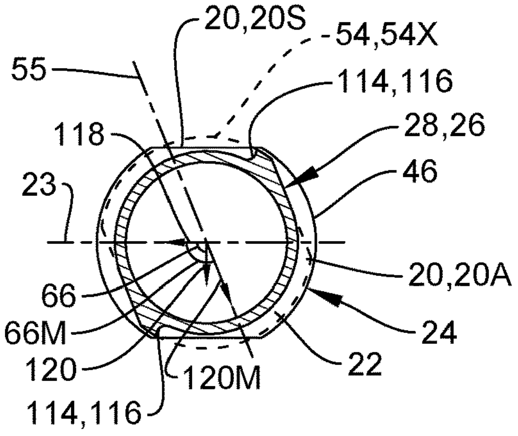
Figure 7:
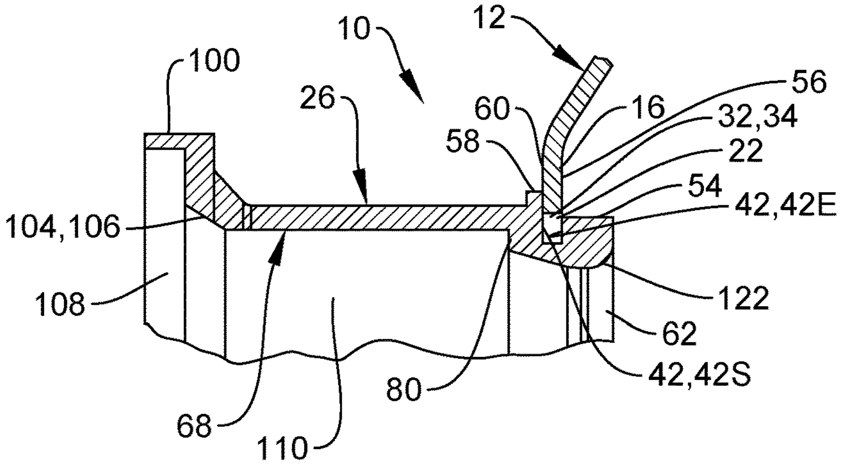
FIG. 7 is a plan cross-sectional view of part of the socket in the insertion orientation and part of a body of the box, as indicated by arrows VII in FIG. 2.
Figure 8:
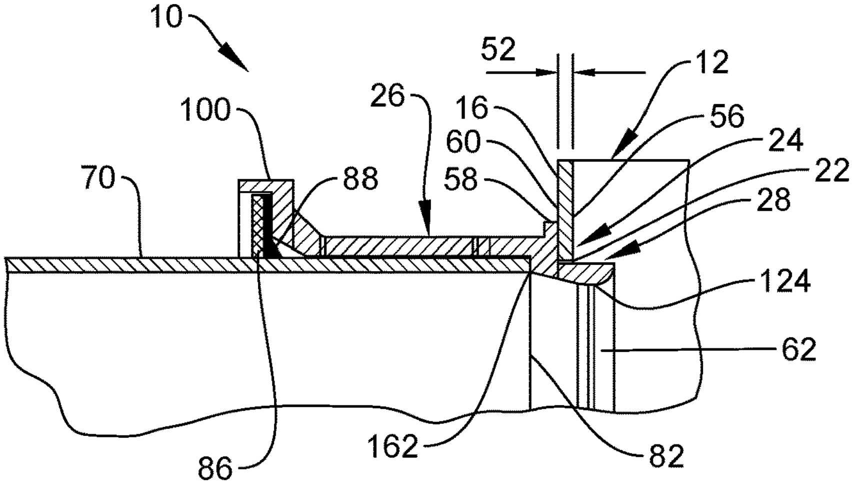
FIG. 8 is a side cross-sectional view of part of the socket in the insertion orientation and part of a body of the box as indicated by arrows VIII, with a conduit in an inserted condition.

The socket 26 is movable between an insertion orientation (denoted in FIGS. 6A and 6B by the reference numeral 118) and a locked orientation (denoted in FIG. 6B by the reference numeral 120). In the assembled condition, the socket 26 is in the locked orientation.

The box 10 is arranged so that, to move to the assembled condition from the disassembled condition, the socket 26 must be inserted into the socket receiving aperture 22 in the insertion orientation 118 and then rotated to the locked orientation 120.

The socket receiving aperture 22 has a shape 46, defined by the aperture edges 20.

The socket receiving aperture shape 46 is non-circular and is elongate along an aperture longitudinal axis 23. The aperture 22 has a length 22L along the aperture longitudinal axis 23 and a width 22W transverse to the aperture longitudinal axis 23. in the example shown, the aperture length 22L is greater than the aperture width 22W.

In the example shown, the socket receiving aperture shape 46 includes a pair of straight edges 20S which are arranged in parallel at opposite sides of the socket receiving aperture shape 46 and a pair of arced edges 20A, one arced edge 20A being located between the straight edges 20S.

The socket receiving aperture shape 46 has an aperture width 146 between the straight edges 20S.

The socket attachment formation 28 has a profile shape 48 which corresponds with, but is smaller than, the shape 46 of the socket receiving aperture 22. The socket attachment formation profile shape 48 can substantially only pass through the socket receiving aperture 22 in the insertion orientation 118.

The socket attachment formation 28 includes an end flange 54, which has a profile shape 54X which comprises the socket attachment formation shape 48 and corresponds with, but is smaller than, the shape 46 of the socket receiving aperture 22. The end flange profile shape 54X comprises peripheral side surfaces 50. In the example shown, the end flange profile shape 54X comprises a pair of straight side surfaces 50S and a pair of arced side surfaces 50A, one arced side surface 50A being located between the straight side surfaces 50S.

The end flange shape 54X is elongate along an end flange shape longitudinal axis 55. The end flange shape 54X has a length 54L along the end flange shape longitudinal axis 55 and a width 54W transverse to the end flange shape longitudinal axis 55. The end flange shape length 54L is greater than the end flange shape width 54W.

The end flange 54 is arranged to pass through the socket receiving aperture 22 substantially only in the insertion orientation.

The end flange 54 comprises one of the groove side walls 42 (denoted 42E) of each of the grooves 32.

The socket attachment formation 28 includes a stop formation which limits insertion of the socket into the aperture and comprises a stop flange 58, which comprises one of the groove side walls 42 (denoted 42S) of each of the grooves 32.

In the example shown, the end flange groove side wall 42E extends at an oblique angle to the longitudinal axis 30 and the stop flange groove side wall 42S extends normally to the longitudinal axis 30.

In the example shown, the end flange groove side wall 42E is curved, and is convex relative to the groove 32.

The stop flange 58 comprises a profile shape 64 which does not correspond with, and is larger than, the shape 46 of the socket receiving aperture 22, so that the stop flange 58 cannot pass through the socket receiving aperture 22 in any orientation.

The socket 26 defines a through passage 62, which extends along the longitudinal axis 30 of the socket 26.

The socket 26 includes a tool engaging part 94, which is located adjacent the stop flange 58 and comprises a plurality of regularly spaced flat surfaces 96 located around the circumference of the socket 26.

The socket 26 includes a gripping part 98 which is located adjacent the tool engaging part 94 and comprises a plurality of gripping formations 102 each of which comprises a longitudinally extending projecting ridge.

The socket 26 includes a relatively enlarged end 100. The relatively enlarged end 100 has a larger external diameter relative to the gripping part 98.

The socket 26 includes a conduit receiving formation 68 for receiving a conduit 70 in an inserted condition. The conduit receiving formation 69 defines a conduit receiving passage part 110, which comprises part of the passage 62.

The conduit receiving formation 68 includes a guide formation 104, which comprises the relatively enlarged end 100. The guide formation 104 includes a sloping guide surface 106 which defines an entry part 108 of the conduit receiving passage part 110.

The conduit 70 includes an insertion end 82, which is a plain end (ie without any engagement features such as a thread formation), which in the inserted condition is located in the conduit receiving formation 68.

In the example shown, the conduit receiving formation 68 includes an abutment wall 80. The abutment wall 80 projects inwardly into the passage 62. The insertion end 82 includes an end face 84 and in the inserted condition, the end face 84 locates against the abutment wall 80 at a junction 126.

The abutment wall 80 is arranged to be substantially the same dimension as the thickness of wall of the conduit 70, so that in the inserted condition, at the junction 126, there is substantially no internal surface step. This reduces the risk of any damage to cable when being installed in the conduit 70, or during use.

The socket attachment formation 28 includes a rounded internal passage surface 122 at a constriction 124. This again reduces the risk of any damage to cable when being installed in the conduit 70, or during use.

The box 10 includes a securing arrangement 74 for securing the conduit 70 to the socket 26 in the inserted condition. In the example shown, the securing arrangement 74 includes a seal washer 86 and a retaining washer 88.

The seal washer 86 could be formed of a resiliently deformable material such as rubber or a plastics material, and could provide a dirt and dust seal in the assembled condition. In other examples, the seal washer 86 could provide a moisture resistant, water resistant or water proof seal.

The retaining washer 88 could be formed of a metal and could comprise an internal star toothed lock washer. The retaining washer 88 is arranged to permit insertion of the conduit 70 therein in one direction, but resists removal of the conduit 70 therefrom in the opposite direction, and in the assembled condition is arranged to permit insertion of the conduit 70 into the socket passage 62 but resist removal of the conduit 70 therefrom.

The box 10 includes a lid 90 for closing the interior 18, which is secured to the body 12 by fasteners 92, which locate in holes 128 defined in tabs 134 as indicated by arrows A in FIG. 1.

The base wall 14 defines a plurality of fixing holes 136.

The body 12 could define a plurality of the apertures 22. In one example, one aperture 22 could be defined in each side wall 16. The box 10 could include removable aperture caps (not shown) which close the apertures 22 when not in use. One or more apertures 22 could be defined in the base wall 24.

The body 12 could comprise one or a plurality of socket receiving aperture locations 76, each of which could comprise a line or area of a relatively thinner wall material 78. In the example shown, each location 76 comprises one area of thinner wall material 78. The thinner wall material 78 is removable (eg by knocking out with a tool) to form an additional socket receiving aperture 22. Alternatively, the or each aperture location 76 could include a line of weakness (not shown) extending around a periphery of the location 76. The line of weakness could comprise perforations or a line of thinner material.

First Embodiment—in Use

One of the advantages of the box 10 of the invention is its simplicity and speed of use in connecting lengths of the conduit 70.

Usually, the body 12 will be secured to a support (eg a wall surface) by fasteners (not shown) such as screws located through the fixing holes 136.

To move to the assembled condition, a user lines up the socket 26 with the socket receiving aperture 22, with the socket 26 in the insertion orientation 118 relative to the body 12, so that the straight side surfaces 50S of the end flange 54 are arranged substantially in parallel with the straight edges 20S of the socket receiving aperture shape 46.

The user then moves the end flange 54 through the socket receiving aperture 22 until the stop flange 58 contacts the edge attachment formation 24. The socket 26 is then rotated about the longitudinal axis 30, to cause the socket attachment formation 28 to engage the edge attachment formation 24. During this operation, the user could grip the socket 26 around the gripping part 98, using the gripping formations 102 for additional purchase.

As the socket 26 rotates from the insertion orientation 118 towards the locked orientation 120, the straight edges 20S of the edge attachment formation 24 are received in relatively wide parts of the grooves 32. The relatively wide parts aid ease of assembly. As the rotation advances, the straight edges 20S move along the groove length 36. The groove width 38 reduces along the groove length 36 so that the groove side walls 42 exert a gradually increasing compressive locking gripping force upon the straight edges 20S. Rotation of the socket 26 gradually becomes harder until it can proceed no further. At this point the user can give the socket 26 a final tightening movement. The user could use a spanner or similar tool to engage the flat surfaces 96 of the tool engaging part 94 of the socket 26 to apply greater torque.

The feature of the convexly curved end flange groove side wall 42E means that the force increases more rapidly in the initial stages of rotation and less rapidly (and therefore more controllably) in the later stages of rotation.

The limit formations 114 ensure that rotation can only proceed in one direction and prevent over tightening which might damage or deform the side walls 16.

Figure 4:
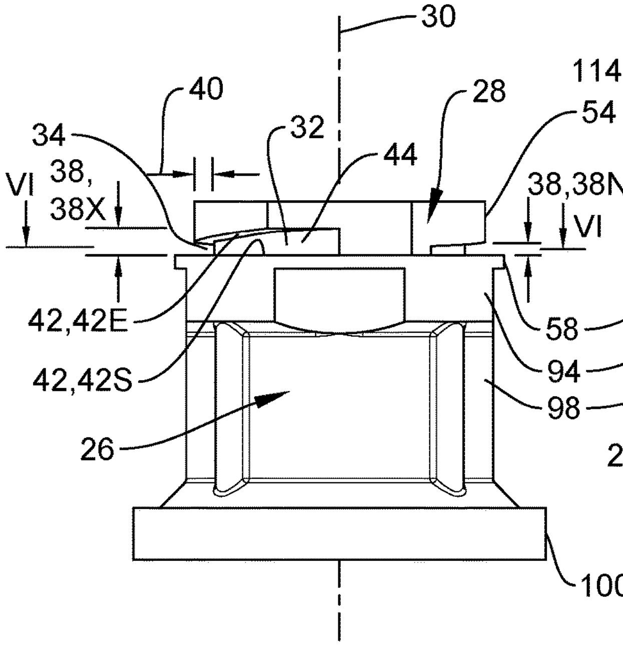
FIG. 4 is a side view of the socket looking along arrow IV in FIG. 3.
Figure 5:
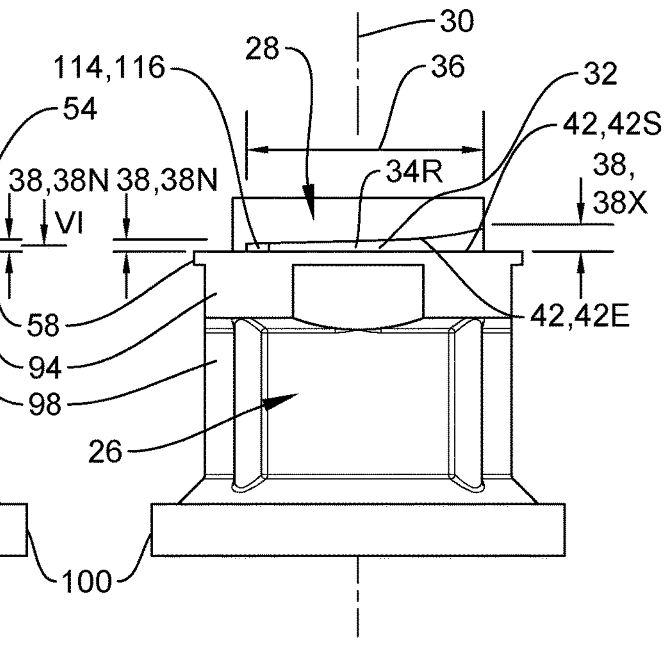
FIG. 5 is a side view of the socket looking along arrow V in FIG. 3.

FIGS. 6A and 6B are plan schematic views of a cross-section of the socket 26 at the level of the groove 32 (as indicated by arrows VI in FIG. 4) and illustrate the function of the limit formations 114.

In FIG. 6A, the socket 26 is in the insertion orientation 118. The socket 26 substantially cannot be turned clockwise (as shown in FIG. 6A, which would be reversed (ie counter clockwise) from the viewpoint of the user) because the limit formations 114 prevent this by engagement with the straight edges 20S.

The socket 26 is rotated as shown by arrow B in FIG. 6B through the rotation angle 66 (of substantially 90°), to the locked orientation 120. A degree of overtightening can take place to the maximum locked orientation 120M through angle 66M at which point further rotation is prevented by the engagement of the limit formations 114 against the straight edges 20S.

In the assembled condition, in the locked orientation, the socket attachment formation 28 exerts a compressive gripping force upon the edge attachment formation 24. In the example shown, the locking compressive force comprises an axial force, which is exerted substantially along or parallel to the longitudinal axis 30, by the groove side walls 42 on the straight edges 20S.

In the assembled condition, in the locked orientation, the end flange side wall 42E locates against an internal face 56 of the edge attachment formation 24, thereby preventing axial withdrawal of the socket 26 from the assembled condition.

In the assembled condition, the stop flange side wall 42S locates against an external face 60 of the edge attachment formation 24, thereby preventing further axial insertion of the socket 26 from the assembled condition.

With the socket 26 in the assembled condition, the conduit 70 is now moved to the assembled condition in the socket 26. In one method, the retaining washer 88 is firstly located in the passage entry part 108 against the sloping guide surface 106. The seal washer 86 is located on the conduit insertion end 82 and the end 82 pushed through the retaining washer 88 and into the passage 62 until the end face 84 locates against the abutment wall 80. The seal washer 86 is then moved to abut against the retaining washer 88.

In an alternative method, both the seal washer 86 and the retaining washer 88 are located on the insertion end 82 which is then inserted into the passage entry part 108 so that the retaining washer 88 locates against the sloping guide surface 106. The conduit 70 is then pushed through the washers 86, 88 until the end face 84 locates against the abutment wall 80.

In a further alternative method of assembly, the conduit 70 could be assembled to the socket 26 and the socket 26 then assembled to the box body 12.

Advantageously, tools are not required to assemble the conduit to the body 12. The sockets 26 are "quick fit" to the body 12 with only a simple 90° turn required. The conduit 70 is "push fit" into the sockets 26. Neither the fitting of the sockets 26 nor of the conduit 70 requires tools and can be undertaken by unskilled personnel.

Advantageously, the conduit 70 can be cut to length on site and the insertion end 82 does not require the further time consuming and skilled operation of thread forming.

A further advantage is that one single junction box 10 of the invention replaces several conventional junction boxes, reducing the number of range stock items required and thus complexity and cost.

A still further advantage is that the box 10 can be disassembled and the components reused.

Another advantage is that casting of the body 12 is not required, simplifying manufacturing.

Description of Second Embodiment

Figure 9:
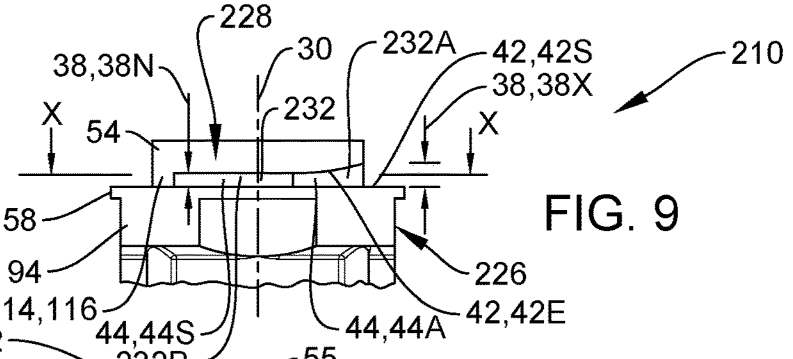
FIG. 9 is a side view similar to that of FIG. 5, of part of a second embodiment of the invention, showing part of a socket comprising a socket attachment formation.
Figure 10:
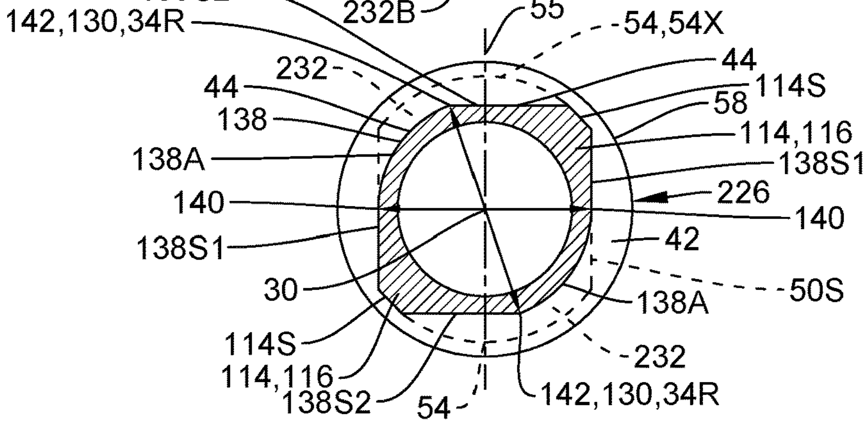
FIG. 10 is a plan view of a cross-section of the socket of FIG. 9 at the level of a groove as indicated by arrows X in FIG. 9, with a profile of an end flange of the socket shown in dashed lines.

FIGS. 9 to 11 show another embodiment of the invention, many features of which are similar to those already described in relation to the embodiment of FIGS. 1 to 8. Therefore, for the sake of brevity, the following embodiment will only be described in so far as it differs from the embodiment already described. Where features are the same or similar, the same reference numerals have been used and the features will not be described again.

FIGS. 9 to 11 show part of a second embodiment of the invention which comprises an electrical conduit junction box 210. The box 210 includes a body 12, which is the same as described above.

The box 210 includes a socket 226. The socket 226 includes a socket attachment formation 228. Other features of the socket 226 apart from the socket attachment formation 228 are the same as those described above.

The socket attachment formation 228 defines a pair of grooves 232, which are substantially identical in shape and size and which are equi-spaced around the longitudinal axis 30, and which, in the assembled condition, receive the edge attachment formation 24. Each groove 232 has a radial cross-sectional area 34 and a length 36.

The socket attachment formation 228 includes groove side walls 42 which define the grooves 232. Each groove 232 has a groove width 38 between the groove side walls 42, which reduces along its length 36, from a maximum groove width 38X to a minimum groove width 38N.

In this embodiment, each groove 232 comprises an entry portion 232A in which the groove width 38 reduces and a parallel portion 232B in which the groove side walls 42 are parallel and the groove width 38 is constant, being constant at the minimum groove width 38N.

In this example, both the maximum groove width 38X and the minimum groove width 38N are greater than the box side wall thickness 52. Thus, in this example, in use, the groove side walls 42 do not apply the locking compressive gripping force upon the straight edges 20S of the edge attachment formation 24. Rather, the compressive force is applied by the groove base walls 44 as will be described below.

FIGS. 10 to 11 show plan views of a cross-section of the socket 226 at the level of the groove 232. At the groove level, the socket 226 has a profile shape 138. The end flange 54 has a profile shape 54X which is shown in dashed lines in FIGS. 10 to 11. In FIGS. 10 to 11, the grooves 232 are shown in plan between the dashed lines of the end flange profile shape 54X and the groove level profile shape 138. Parts of the groove level profile shape 138 comprise the base walls 44 of the grooves 232.

The groove level profile shape 138 includes a pair of oppositely extending limit formations 114 which extend to the full diametrical width of the end flange 54. Each limit formation 114 forms an end wall 116 to the respective groove 232. Each limit formation 114 comprises an outer surface 114S.

Following the line of one half of the groove level profile shape 138 round clockwise from one of the limit formation outer surfaces 114S as shown in FIG. 10, the groove level profile shape 138 includes a first straight part 138S1, an arced part 138A, a second straight part 138S2 and then the other limit formation outer surface 114S. The next half of the groove level profile shape 138 is the same, comprising, in sequence, another first straight part 138S1, another arced part 138A, another second straight part 138S2 and then back to the first limit formation outer surface 114S The first straight parts 138S1 are parallel to each other and are spaced apart by a first groove profile width dimension 148A which is close to, but less than, the aperture width 146.

The second straight parts 138S2 are parallel to each other and are spaced apart by a second groove profile width dimension 148B, which is substantially the same as the first groove profile width dimension 148A and is close to, but less than, the aperture width 146.

The arced parts 138A are not centred on the socket longitudinal axis 30 (which is the centre of rotation of the socket 26). At a first junction 140 between the first straight part 138S1 and the arced part 138A, the groove level profile shape 138 has a diametrical width 140W which is the same as the first groove profile width dimension 148A and less than the aperture width 146.

At a second junction 142 between the arced part 138A and the second straight part 138S2, the groove level profile shape 138 has a diametrical width 142W which is a little greater than the aperture width 146.

The second junctions 142 comprise interference formations 130.

Figure 11A:
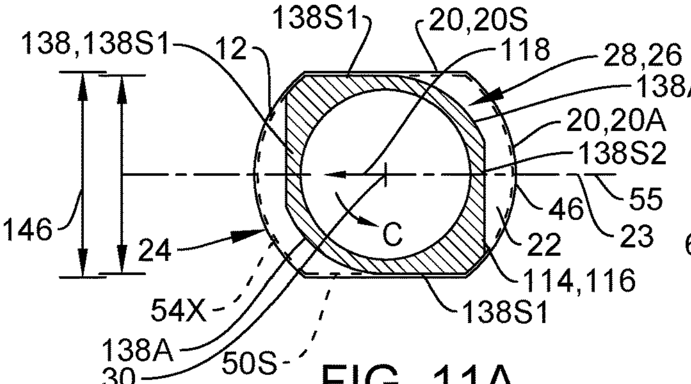
FIGS. 11A, 11B and 11C are plan views similar to those of FIG. 10 with the socket located in a socket receiving aperture, with the socket in the insertion orientation, a maximum friction orientation and a locked orientation respectively.
Figure 11B:
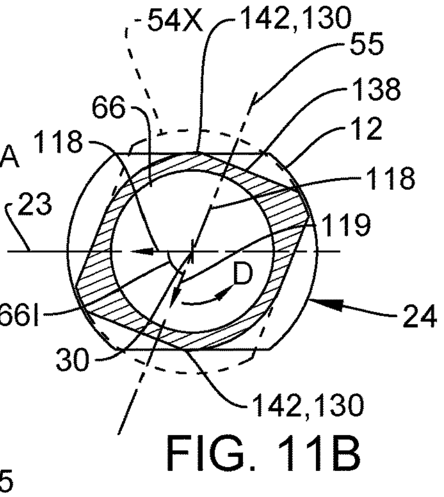
Figure 11C:
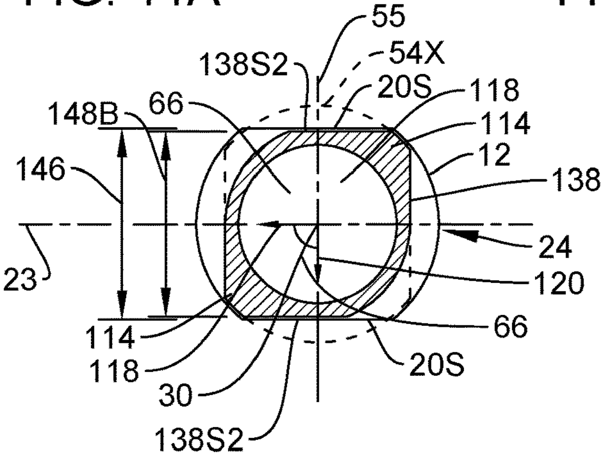

Referring to FIGS. 10 and 11, the socket 226 is movable between the insertion orientation 118 shown in FIG. 11A, a maximum friction orientation 119 shown in FIG. 11B and the locked orientation 120 shown in FIG. 11C. In the assembled condition, the socket 226 is in the locked orientation.

The box 210 is arranged so that, to move to the assembled condition from the disassembled condition, the socket 26 must be inserted into the socket receiving aperture 22 in the insertion orientation 118 and then rotated through the maximum friction orientation 119 to the locked orientation 120.

Second Embodiment—in Use

In this embodiment, in moving from the disassembled condition to the assembled condition, the socket 226 moves through a maximum friction condition, as will be described below.

To move to the assembled condition, the user lines up the socket 226 with the socket receiving aperture 22, with the socket 226 in the insertion orientation 118. In the insertion orientation, the straight side surfaces 50S of the end flange 54 and the first straight parts 138S1 of the groove level profile shape 138 are arranged substantially in parallel with the straight edges 20S of the socket receiving aperture shape 46.

The user then moves the end flange 54 through the socket receiving aperture 22 until the stop flange 58 contacts the edge attachment formation 24.

The socket 226 is then rotated about the longitudinal axis 30, to cause the socket attachment formation 28 to engage the edge attachment formation 24.

As the socket 26 rotates (as shown by arrow C in FIG. 11A) from the insertion orientation 118 shown in FIG. 11A, the straight edges 20S of the edge attachment formation 24 are received in the groove 232. As the rotation advances, the straight edges 20S move along the groove length 36 and along the arced parts 138A of the groove level profile shape 138, until the maximum friction condition is reached in which the socket 226 is in the maximum friction orientation 119, as shown in FIG. 11B.

At the maximum friction orientation, the socket 226 has moved through an angle 66I of between 58° to 68°, in one example, of approximately 68°.

At the interference formations 130, the second junction diametrical width 142W is a little greater than the socket receiving aperture profile width 146, so that the interference formations 130 contact the straight edges 20S, applying the locking compressive force which comprises a friction force which resists movement and requires the user to twist a little harder in the direction of Arrow D in FIG. 11B. The interference formations 130 are arranged, not to provide an absolute stop to the rotational movement, but slow the movement and require the user to exert a little more force.

This in this embodiment, each interference formation 130 defines one of the reduced cross-sectional area locations 34R and which both together contact the edge attachment formation 24 at the maximum friction orientation 119. Advantageously, in this example, the socket 226 is self centring in the aperture 22.

Once the user has rotated the socket 226 past the maximum friction orientation 119, the friction reduces and the movement becomes easier, until the locked orientation 120 is reached as shown in FIG. 11C, in which the second straight parts 138S2 of the groove level profile shape 138 are arranged substantially in parallel with the straight edges 20S of the socket receiving aperture shape 46 and the limit formations 114 contact the straight edges 20S, preventing further rotation.

Advantageously, the interference formations 130 provide a tactile indication to the user that the socket 226 has been correctly and completely moved to the assembled condition.

Advantageously, the interference formations 130 provide a form of over centre locking which prevents or hinders undesired movement of the socket 226 from the assembled condition to the disassembled condition. Such undesired movement could be caused by accident, vibration or the like.

To move the socket 226 from the assembled condition to the disassembled condition, it is necessary to move the socket 226 back through the maximum friction condition.

Other Modifications

Various other modifications could be made without departing from the scope of the invention. The box, the body, the socket and the other components could be of any suitable size and shape, and could be formed of any suitable material (within the scope of the specific definitions herein).

In one embodiment, the groove depth 40 could reduce along the groove length 36, rather than the groove width 38 reducing, so that, in the assembled condition, the groove base wall 44 exerts the locking compressive gripping force on the edge attachment formation 24. In this embodiment, the locking compressive force comprises a radial force, which is exerted substantially radially to the longitudinal axis 30.

In another embodiment, both the groove depth 40 and the groove width 38 could reduce along the length 36, so that the gripping force is exerted by both the groove base wall 44 and the groove side walls 42.

The shape of the socket receiving aperture could be different to that described and in other embodiments could be any suitable non-circular shape, for example, oval or polygonal.

The conduit receiving formation could be different to that described. Any suitable conduit receiving formation could be utilised. In some embodiments the conduit receiving formation could be arranged to be watertight and/or gas tight.

The box of the invention could encompass any housing to which conduit is required to be connected, eg switch boxes, junction boxes, connector boxes, terminal boxes, electrical boxes, control boxes, cabinets, enclosures and housings. The box could include one or more gland plates and the socket receiving aperture could be defined by the or one of the gland plates.

Any of the features or steps of any of the embodiments shown or described could be combined in any suitable way, within the scope of the overall disclosure of this document.

There is thus provided an electrical conduit junction box with a number of advantages over conventional arrangements. In particular, the box of the invention permits the connection of conduit on site rapidly and without the use of tools by unskilled personnel. The box is easy to manufacture and reduces the number of range stock items required.

What is claimed is:

1. An electrical conduit junction box, the box including a body defining an interior, the body including an edge attachment formation which defines a socket receiving aperture, the box including a socket, the socket including a socket attachment formation, the box being movable from a disassembled condition in which the socket is separate to the body and an assembled condition in which the socket is located in the socket receiving aperture and the socket attachment formation engages the edge attachment formation to secure the socket to the body;

the socket attachment formation defines a groove, which, in the assembled condition, receives the edge attachment formation;

the groove has a cross-sectional area and a length, and the cross-sectional area is reduced in at least one location along the length;

the socket is movable between an insertion orientation and a locked orientation and in the assembled condition is in the locked orientation;

the box is arranged so that, to move to the assembled condition from the disassembled condition, the socket must be inserted into the socket receiving aperture in the insertion orientation and then rotated to the locked orientation;

in moving from the disassembled condition to the assembled condition, the socket moves from the insertion orientation to a maximum friction orientation and then to the locked orientation;

the socket attachment formation includes a pair of interference formations, each of which defines one of the reduced cross-sectional area locations and which both together contact the edge attachment formation at the maximum friction orientation;

the socket receiving aperture has a shape;

the socket receiving aperture shape includes a pair of straight edges, which are arranged in parallel at opposite sides of the socket receiving aperture shape and are spaced apart by an aperture width;

the interference formations extend diametrically oppositely away from each other;

the interference formations have a diametrical width;

the diametrical width of the interference formations is greater than the aperture width.

2. The box according to claim 1, in which the socket includes a conduit receiving formation for receiving a conduit.

3. The box according to claim 1, in which, in moving to or at the assembled condition, the socket attachment formation exerts a locking force upon the edge attachment formation, which comprises a compressive force.

4. The box according to claim 3, in which the socket has a longitudinal axis, and in moving to the assembled condition, the socket is rotated about the longitudinal axis, to cause the socket attachment formation to engage the edge attachment formation.

5. The box according to claim 4, in which, in moving from the disassembled condition to the assembled condition, the socket rotates through a rotation angle, which is no more than 120° and may be substantially 90°.

6. The box according to claim 3, in which the edge attachment formation includes edges, which define the socket receiving aperture, which are plain edges and in the disassembled and assembled conditions are not threaded.

7. The box according to claim 3, in which the groove has a cross-sectional area and a length, and the cross-sectional area is reduced in at least one location along the length; at the reduced cross-sectional area location, the socket attachment formation exerts the locking force upon the edge attachment formation.

8. The box according to claim 4, in which the socket attachment formation defines a plurality of the grooves, which are substantially identical in shape and size and are equi-spaced around the longitudinal axis and are rotationally symmetrical.

9. The box according to claim 8, in which the socket attachment formation defines a pair of the grooves.

10. The box according to claim 1, in which the socket receiving aperture has a shape which is non-circular and may be is elongate.

11. The box according to claim 1, in which the socket attachment formation includes an end flange, which has a shape, which corresponds to the shape of the socket receiving aperture, and the end flange is arranged to pass through the socket receiving aperture substantially only in the insertion orientation.

12. The box according to claim 11, in which, after the end flange has passed through the aperture in the insertion orientation, the socket is rotated towards the locked orientation which causes the edge attachment formation to locate in the groove.

13. The box according to claim 4, in which the socket attachment formation includes a limit formation, which limits rotation of the socket about the longitudinal axis.

14. The box according to claim 1, in which the socket attachment formation includes a stop formation which limits insertion of the socket into the socket receiving aperture.

15. The box according to claim 1, in which the groove is defined by side walls spaced apart by a width, and the width reduces to comprise the reduced cross-sectional area location.

16. The box according to claim 1, in which the groove has a depth defined by a base wall and the depth reduces to comprise the reduced cross-sectional area location.

17. The box according to claim 1, in which the box is movable between the disassembled condition and the assembled condition.

* * * * *